United States Patent
Hiltunen et al.

(10) Patent No.: US 7,627,549 B1
(45) Date of Patent: Dec. 1, 2009

(54) METHODS AND SYSTEMS FOR TRANSFERRING DATA OVER ELECTRONICS NETWORKS

(75) Inventors: Matti A. Hiltunen, Chatham, NJ (US); Richard D. Schlichting, New Providence, NJ (US); Vinay A. Vaishampayan, Summit, NJ (US)

(73) Assignee: AT&T Corp., New York, NY (US)

(*) Notice: Subject to any disclaimer, the term of this patent is extended or adjusted under 35 U.S.C. 154(b) by 265 days.

(21) Appl. No.: 11/305,779

(22) Filed: Dec. 16, 2005

(51) Int. Cl.
*G06F 17/30* (2006.01)

(52) U.S. Cl. .......................................... 707/2; 709/228
(58) Field of Classification Search ........................ None
See application file for complete search history.

(56) References Cited

U.S. PATENT DOCUMENTS

| | | | |
|---|---|---|---|
| 5,841,979 A * | 11/1998 | Schulhof et al. | 709/237 |
| 6,725,229 B2 | 4/2004 | Majewski et al. | |
| 2001/0029520 A1* | 10/2001 | Miyazaki et al. | 709/200 |
| 2002/0126812 A1 | 9/2002 | Majewski et al. | |
| 2002/0174267 A1* | 11/2002 | Erdmenger et al. | 709/330 |
| 2003/0191758 A1 | 10/2003 | Majewski et al. | |
| 2003/0217070 A1* | 11/2003 | Gotoh et al. | 707/102 |
| 2005/0273514 A1* | 12/2005 | Milkey et al. | 709/232 |

* cited by examiner

*Primary Examiner*—Pierre M Vital
*Assistant Examiner*—Truong V Vo

(57) ABSTRACT

Methods and systems for managing the transfer of large data files across electronic data networks optimally in accordance with the desired results of the users. The present invention takes into consideration the user-defined transfer requirements, the data characteristics, and the characteristics of the entirety of the network, including both the access links and the backbone and processing and storage resources in the backbone. The present invention the enables users to more optimally transfer data within the limitations of the existing network capabilities, negating requirements to update local or remote network facilities.

20 Claims, 8 Drawing Sheets

METHODS AND SYSTEMS FOR TRANSFERRING DATA OVER ELECTRONICS NETWORKS

FIELD OF THE INVENTION

This invention relates generally to electronic data communications and more particularly to methods and systems for transferring electronic data over networks.

BACKGROUND OF THE INVENTION

Electronic networks such as the Internet have become a pervasive way of transferring not only communications information, but critical personal, company and even entertainment data. As more and more companies maintain their critical information in electronic format, users face the need to transfer increasingly large files (>100 GB) from one user site to another; for example video data, CAD drawing data, scientific instrument data, and other datasets as will be apparent to the reader. While many electronic network backbones have adequate bandwidth to handle large data transfers, the users' access links to these backbones typically have limited bandwidth (e.g., T1 at 1.5 Mbps or T3 at 44.7 Mbps). Consider, for example, transferring a 100 GB file over such links—with a T1 access capability it would take more than 6 days and even with T3 access over 5 hours. Even those times assume the access links are only used for these file transfers and not otherwise utilized.

Both network service providers and the customers of network service providers are facing the problem of how to effectively handle increasingly large data volume and data size transfers. The different parties have different solutions to this problem. The incumbent local exchange carriers (ILECs) that own the access links to the customer premises typically sell the customers more access links. End-users and system integrators sometimes use end-point solutions that virtually increase the bandwidth of the network with caching and compression techniques before data is sent to the wide area network (WAN). For example, WAN accelerators/optimizers such as the PeriScope™ product from Peribit Networks perform compression before user data is passed to the network and/or after it has been received from the network. Other WAN accelerator vendors include Network Executive Software Inc. (NetEx) and Swan Labs Corp.

Another type of virtual bandwidth improvement product, a Wide Area File Service (WAFS), accelerates remote file access through a WAN to a data center, whereby to appear as fast as a LAN file system access, using caching and other techniques. WAFS vendors include Cisco, DiskSites Inc., FineGround Networks, Riverbed Technology Inc., and Tacit Networks Inc.

Yet another type of virtual accelerator, CDNs (Content Distribution Networks) are used to speed up the delivery of web pages to large numbers of receivers (readers). The concern typically addressed by a CDN is not with the size of data to be transferred, but the number of readers it is to be distributed to. Thus, CDNs are designed to improve server bottlenecks.

While providing the appearance of temporary improvements in limited areas, the above techniques do not address the fundamental problem of data transfer sizes increasing faster than end-to-end network bandwidths are capable of timely handling.

In summary, network user data size and transfer requirements are exceeding the capability of existing network infrastructures and services to effectively handle. While limited acceleration solutions exist for portions, typically end-portions, of the network, these are not comprehensive or long-term solutions. Given the fundamental constraints of the existing network infrastructure, the present inventors have recognized the need for a more comprehensive and long-term solution to large, timely file transfer requirements.

SUMMARY OF THE INVENTION

In one embodiment of the invention there are provided methods and systems for optimizing the transfer of a data file of electronic data between a source and destination across an electronic network, a method comprising: determining data parameters of the data file; determining network parameters of the network; determining user-defined transfer parameters for transferring the data file between the source and the destination; and determining, based on the data parameters, network parameters and transfer parameters, a method for transferring the data file from the source to the destination across the network that satisfies the transfer parameters; and initiating the transfer of the data file in accordance with the desired method.

In another embodiment of the invention there are provided methods and systems for determining an optimal process for transferring a data file of electronic data between a source having a source access link and one or more destinations each having a respective destination access link, the transfer across an electronic network including stages containing storage and processing resources, a method comprising: constructing a diagram of available data transfer sequences including a direct path corresponding to a direct transfer of the data file from the source to the destination, a plurality of compression paths, each compression path corresponding to a compression technique for compressing the data file at the source, a direct transfer of the compressed data file from the source to the destination, and a decompression technique for decompressing the compressed data file at the destination, at least one staged path corresponding to transferring the data file from the source to at least one storage server in the electronic network and then transferring the data file from the electronic network to the destination, and a plurality of staged compression paths, each corresponding to a compression technique for compressing the data file at source, transferring the data file over at least one staged path in the network, and a decompression technique for decompressing the data file at the destination; associating with each path a benefit and a cost; and determining at least one path providing a desired benefit: cost ratio for the transfer of the data file.

In yet another embodiment of the invention there are provided methods and systems for optimizing the transfer of a data file of electronic data between a source and destination across an electronic network, a system comprising: a status manager for determining the data parameters of the data file, the network parameters of the network and user-defined transfer parameters for transferring the data file between the source and the destination; an optimizer for determining, based on the data parameters, network parameters and transfer parameters, a method for transferring the data file from the source to the destination across the network that satisfies the transfer parameters; and a data transfer scheduler for initiating the transfer of the data file in accordance with the desired method.

The present invention maintains for the user the abstraction of a traditional file transfer from a sender to a receiver(s), while internally implementing the present invention to enable a number of optimizations. In one described embodiment, the solution is network-based in the sense that a file is first transferred to the network, which then takes care of delivering it to all the receivers. As a result, the act of transferring a file and receiving a file are decoupled, resulting in opportunities to separately and in combination optimize the usage of access links and the backbone network, as appropriate. In a described embodiment, users of the present invention use a traditional web interface to specify which files to transfer, who the recipients are, and on what schedule the files are to be transferred. The present invention then functions to determine how to optimize the file transfer process.

One goal of the present invention is to utilize all available resources in both the network infrastructure and on the customer premises (network, storage, CPU), along with the characteristics of the data to be transferred (type of data, lifetime transfer pattern) to develop a transfer strategy that achieves the desired transfer deadlines while minimizing the utilization of the bottleneck resources, for example as are typically found in the customer access links.

DESCRIPTION OF THE DRAWING FIGURES

These and other objects, features and advantages of the present invention will become apparent from a consideration of the Detailed Description Of The Invention, in combination with the drawing Figures, in which.

DETAILED DESCRIPTION OF THE INVENTION

The present invention includes methods and systems that enable large customer data files to be transferred intelligently across networks by optimizing data transfers based upon data characteristics, network access link characteristics and/or network characteristics. In contrast to the prior art, the present invention considers the characteristics of not just the end point access links, but also of the data itself and the network as an entirety, including the various links therein.

As used herein, examples and illustrations are for the purpose of describing the present invention and, unless expressly stated otherwise, are not limiting or exclusive.

As used herein, "optimize," "optimal" and variants thereof indicate the best use of available network resources while meeting user-defined data transfer requirements.

Figure 1:
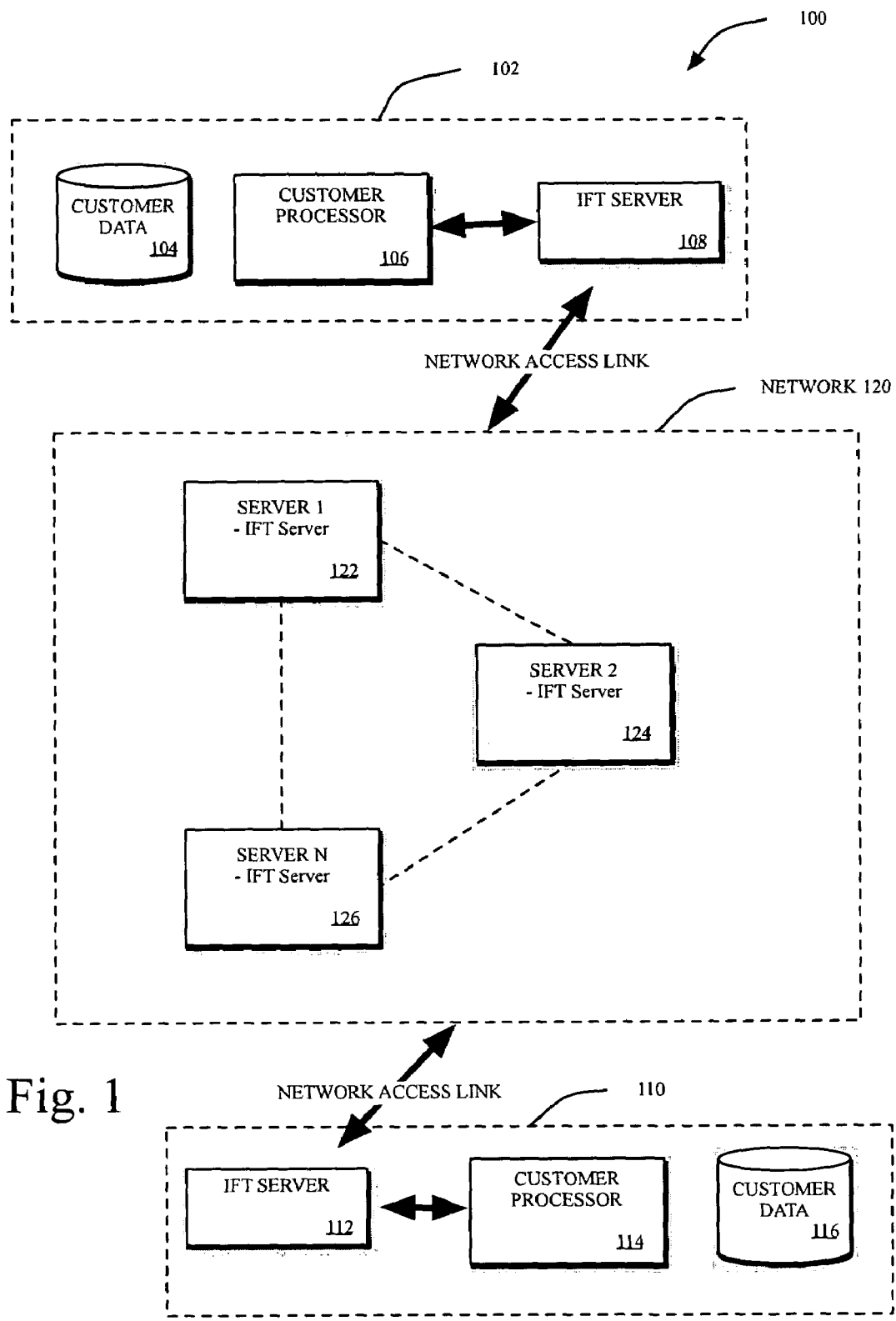
FIG. 1 is a block diagram of a system including network facilities illustrative of the present invention.

With reference now to FIG. 1, there is shown a system 100 in accordance with the present invention including two customer, or user, systems, indicated at 102,110, desiring to share large data files of the type described herein above. Each customer system includes a processor 106,114, a customer file server for storing the large files 104,116 and, in accordance with the present invention, an intelligent file transfer server (IFT) indicated at 108,112. Customers 102, 110 are connected to communicate through network 120, the network seen to comprise a packet switching network, such as the Internet. In addition to the standard network links and routing elements, the network may contain a plurality of servers with storage and processing capabilities, three of which are indicated at 122,124 and 126.

With the exception of IFT servers 108, 112, the details of which are described herein below, it will be understood by the reader that user systems 102, 110 comprise substantially any network-able computing system. Examples include: desktop computers, notebook computers, server computers, mainframe computers, personal digital assistants, programmable communication devices, network gateways/servers and others as will be apparent to the reader. These user systems can run one or more conventional operating systems, and include conventional components such as user interfaces, communication interfaces, and others as will be known to the reader.

Network 120 comprises a conventional packet-switching network, for example the Internet, the various servers 122, 124, 126 optionally including the IFT server functions such as processing and storage and other capabilities as described herein. In a manner well recognized in the art, such packet switching networks include a plurality of routers and other networking elements, interconnected to receive and re-transmit data packets in accordance with predetermined protocols, where by to facilitate communications of information between parties such as the users. An exemplary network is the Internet, using the conventional Internet Protocol, or TCP/IP suite of protocols. The IFT servers may be located at data/hosting centers or can be co-located with existing network elements (e.g., an edge router). The IFT servers can store data files, process them, and transfer them to the eventual destinations. Other relevant details of such networks are described in further detail herein below.

For purposes of illustrating the present invention, the various user systems and network have been described in relatively simplified format. It will be apparent to the reader that these systems may comprise many different configurations and levels of complexity. These systems may comprise, for example, geographically disperse components, multi-processor components, complex and disperse database storage systems, and other configurations as will now be apparent to the reader. Similarly, network 120 may comprise relatively limitless numbers of configurations.

Figure 2:
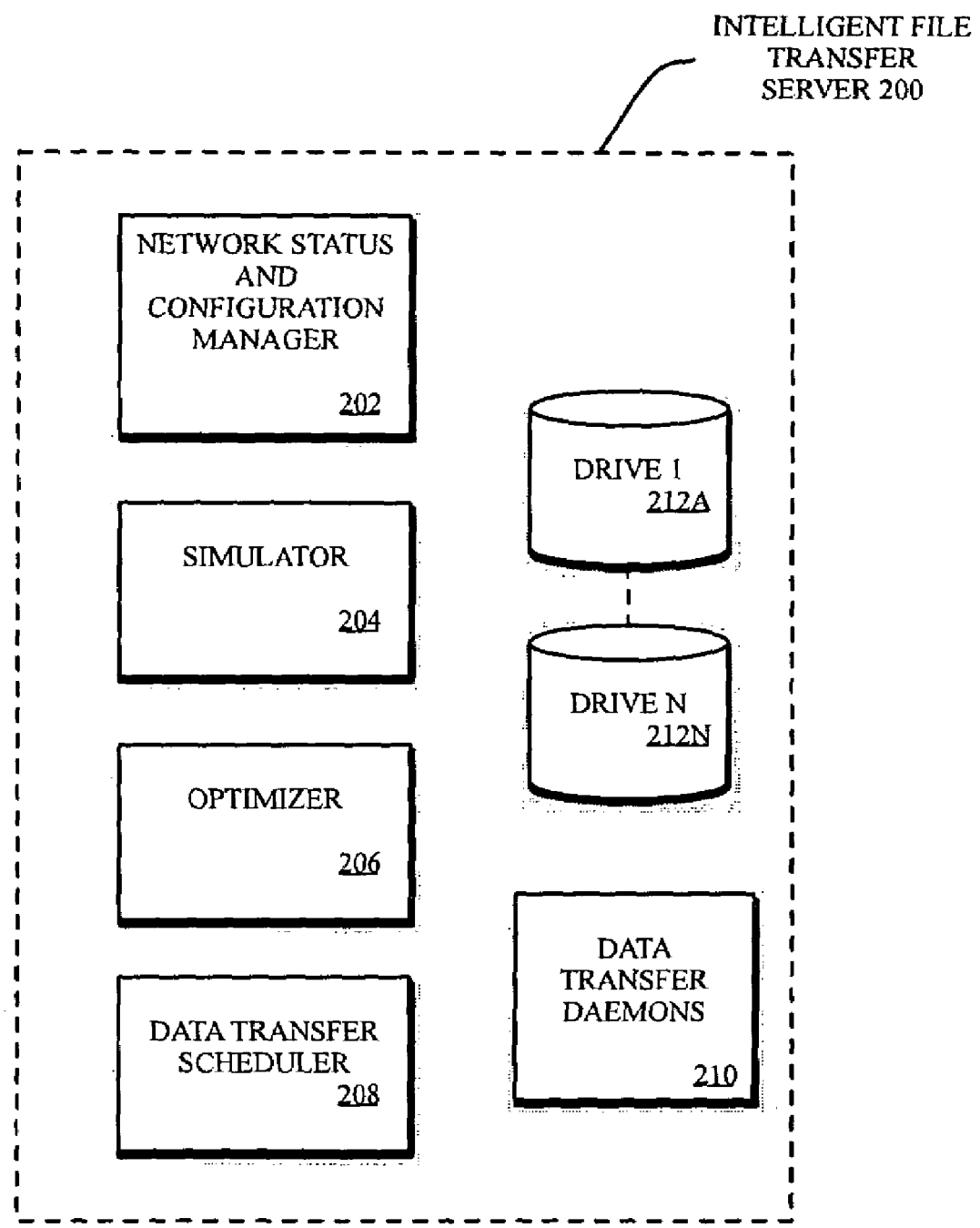
FIG. 2 is a block diagram showing functional aspects of an intelligent file transfer server.

With reference now to FIG. 2, there is shown and described an exemplary embodiment of the functions of an intelligent file transfer (IFT) server 200, the IFT server including: a networks status and configuration manager 202 for collecting or receiving, and storing, information about the configuration and status of the network 120, including such information as: network hardware components, network software components, data channel configurations and speeds, data-in-transfer status and related information, cached-data version, age, size and other status information, and other information pertinent to the ability of the network to process data.

IFT server 200 further includes a simulator 204 for simulating various data transfer alternatives within the network, an optimizer 206 for optimizing the transfer of large files of data, and a data transfer scheduler 208 for scheduling the transfer of data files in accordance with the present invention. Data transfer daemons 210, or background software processes, are seen to function for effecting the actual transfer of the data in accordance with the determination of the IFT server 200. One or more data storage devices, indicated at 212A-N, might optionally be included for the purpose of temporarily storing the data file(s) under transfer.

While the various functions of the IFT server 200 have been indicated as distinct components, it will be understood by the reader that these functions may comprise any appropriate combination of hardware and software, including such hardware and software as may be incorporated within customer sites 102, 110 and/or nodes 122, 124, 126. For example, these functions may be provided by a customer processor 106, 114 and/or a customer data store 104, 116, and/or a server processor or data store co-located with a network element or hosting center. Alternatively, they may comprise functions separate and discreet from those provided by customer equipment. Further, multiple functions may be consolidated and/or, where appropriate, less than all of the functions may be incorporated within an IFT server.

Figure 3:
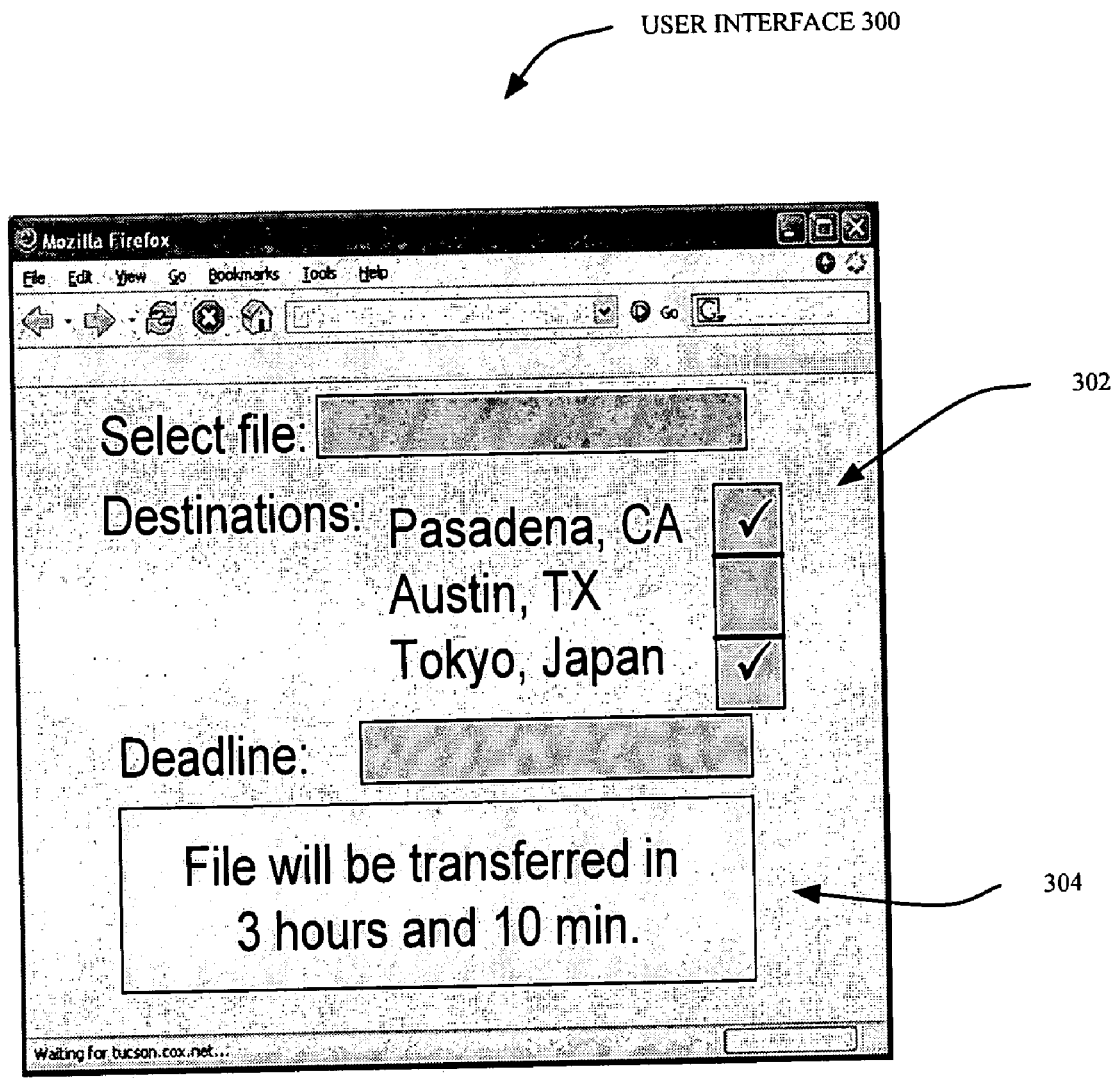
FIG. 3 shows an exemplary graphically user interface.

With reference now to FIG. 3, there is shown an exemplary user interface 300, illustrating the simplicity of the operation of the present invention from the standpoint of a user of a system 102, 110. In accordance with the described embodiment of the present invention, to effect a transfer of a large data file, a customer may supply simple transfer information 302, selecting a file to transfer, a destination for the file, and a deadline within which the file transfer must occur. In accordance with the process described here in below, the invention will determine all of the necessary settings and controls to affect an optimal data transfer, communicating a simple confirmatory message 304 back to the customer.

Figure 4:
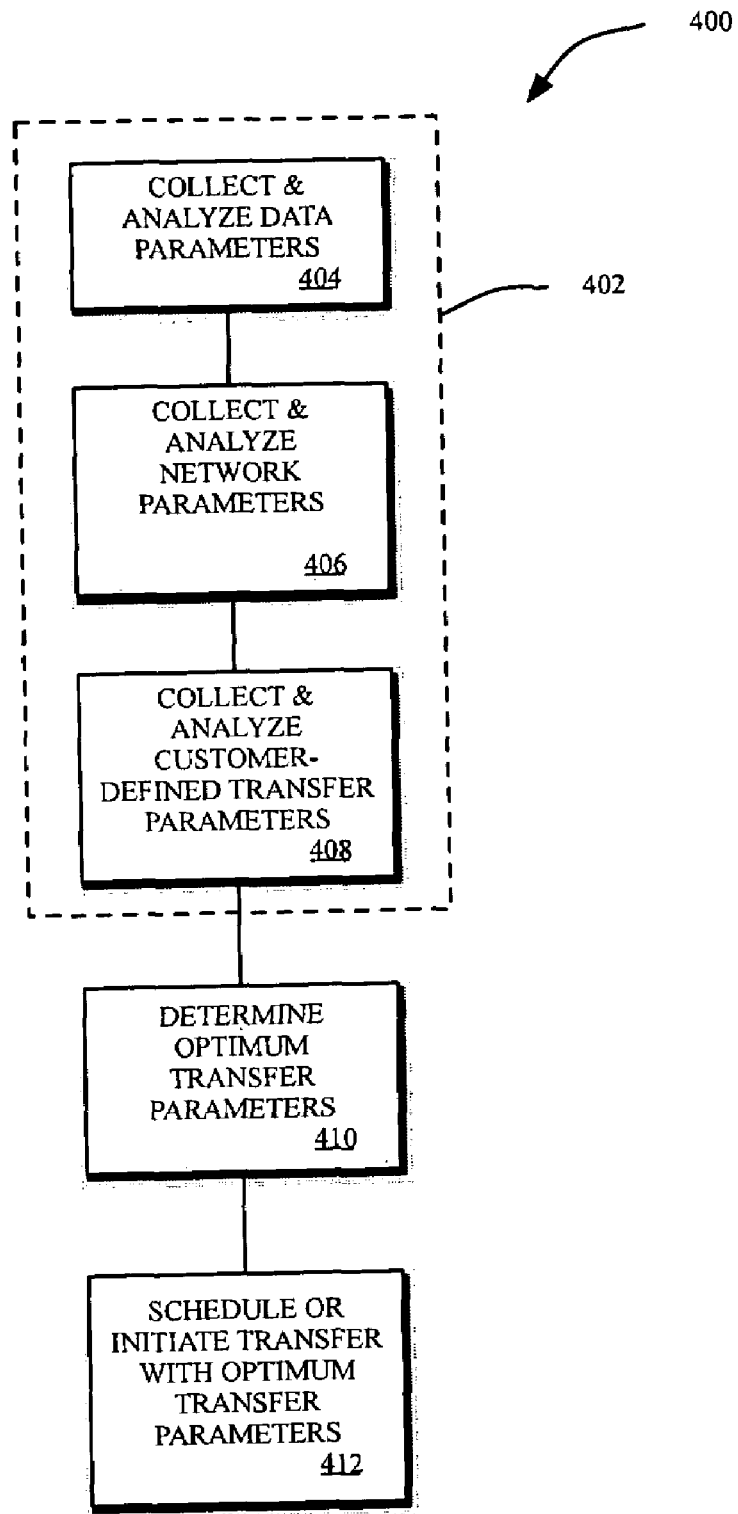
FIG. 4 shows a process for implementing large file transfers in accordance with the present invention.

With reference now to FIG. 4, a process 400 is shown wherein large data files are transferred in an optimal manner in accordance with the present invention. Initially, as indicated at 402, the relevant parameters are collected and analyzed as relating to the data to be transferred (step 404), the network (step 406) and the customer-defined transfer parameters (step 408). Relevant data parameters include, for example: data size, data type, data location, current compression status of the data, current encryption status of the data and others as will now be apparent to the reader.

Relevant network parameters include, for example, with respect to the customer sites 102, 110: the type and capacity of access links, the utilization of the access links, other file transfers scheduled over these access links, as well as the possible availability of (prior) versions of the file to be transferred at the customer sites. Relevant network parameters include, for example, with respect to the IFT servers 122, 124, 126 in the network 120: network structure, network capacity, network speed, network utilization (current and anticipated), available storage and processing resources at the IFT servers, and the possible availability of (prior) versions of the data to be transferred located at the IFT servers.

Relevant customer transfer parameters include, for example: the number of selected recipients, the number and location of the recipient sites, the time within which the data transfer must be completed, periodic retransmission information (if any) and others as will now be apparent to the reader.

The process of collecting and analyzing the various parameters can be performed by the network status and configuration manager 202.

Subsequent to the collection and analysis of the various data transfer and network parameters, there is determined the optimum data transfer processes and/or parameters (step 410), for example using optimizer 206. For purposes of description, references to the network 120 will be understood to include the IFT servers 122, 124, 126 located at the network 120 and the various computing and communications resources therein. For purposes of describing the present invention, data transfers will be considered to include at least 4 different types:

1. Producer-to-Consumer(s), Type I. In this scenario, data is produced once and sent once to one or more consumers over a wide area network. Examples include: data generated from a telescope, media distribution from a media headquarters to affiliates, and others as will now be apparent to the reader.

2. Producer-to-Consumer(s), Type II. In this scenario, data is produced and consumed by one or more consumers, repeatedly. Examples include: a PowerPoint™ or other presentation updated and sent from a company headquarters to branch offices repeatedly, web pages (e.g., from a commercial Website) updated and read repeated by readers, and others as will now be apparent to the reader.

3. Producer-to-Editor-to-Editor. In this scenario, the data object (e.g., a database) is created once and then is rotated among multiple client sites each of which updates the object. Examples include a CAD design database, and others as will now be apparent to the reader.

4. Producer-to-Editor-to-Editor-to-Consumer(s). In this scenario, a data object is created and then edited by multiple editors at different client sites before being consumed by one or more consumers. Examples include: A document edited by possibly multiple participants before being released to the public, a TV program produced (raw video), edited (special effects, sub titles, audio, etc) and broadcast to the public, and others as will now be apparent to the reader.

Optimization techniques for optimizing the data transfer can include one or more of the following:

Compression: For each file transfer, compress the file at the source; decompress it at the destination(s). Compression is useful for all data transfer scenarios 1-4 if the data is of the type that can be compressed. Any compression will reduce access link utilization. End-to-end latency reduction depends on the time it takes to compress/decompress the data and transfer the compressed data versus transfer of the uncompressed data.

Multicasting: If data needs to be transferred from one source to multiple destinations, provide a multicast file transfer protocol (MFTP) that only requires the source to send the data once. Multicasting is useful for the multiple consumer cases in scenarios 1 and 2 above, in that it reduces access link utilization at the sender. Since data is sent only once, the end-to-end latency is expected to also be reduced in this scenario.

Parallel transmission over replicated access links: If the client site has multiple network connections to the network 120 backbone, for example DSL and cable modem network connections, the data to be transferred can be divided up and transmitted over the different links concurrently. Parallel transmissions are useful in all scenarios above if multiple access links are available.

Satellite broadcast with wired network error correction: A number of variations on this technique are possible, including: error correction provided only by the original source, peer-to-peer error correction solution, fixing of the gaps after the satellite broadcast, and others as will be apparent to the reader. Useful in any scenario where the number of receivers is large or if the data volume (even in the case of one receiver) is too large for terrestrial access links.

Delta compression at end-points: Each site that receives the data maintains a copy of the data, with only the delta, difference between the last-transferred version and the latest different version, being transferred when a recipient site requires updated data. End-point delta compression is useful in scenarios 2, 3, and 4 above if the same site is included multiple times in the data transfer chain. Provided the time taken by delta-compression and decompression is reasonable, this end-point delta compression is effective both by reducing network utilization and data transfer latency.

Staged data transfer: In a staged data transfer, data is transferred first from an end-point to the network 120 backbone, specifically, the IFT servers located in the network, and then from the network to the destination(s). Staged data transfer can be effectively used in all transfer scenarios. It is noted there is no direct decrease in utilization and in fact the technique may increase end-to-end latency. However, it provides the foundation for other network-based resource-saving techniques, typically based on independent scheduling of transfer phases, that is, data is transferred to the network from the source when the sources access link is not highly utilized and then later from the network to the receiver(s) when their access links are available. Thus the end-point network access link can be used when it is available, i.e., not highly utilized. An increase in the end-to-end transfer latency may be expected because the data may now reside in one of the IFT servers 122, 124, 126 for an extended period of time.

Staged data transfer combined with delta-compression: In a staged data transfer with delta-compression, the network 120, specifically, the IFT servers located in the network, maintains different versions of the data and, if an end-point modifies the data, it only needs to transfer the delta modifications to the network node where the earlier version of the data resides. The network node can then construct the latest version of the data and further transfer it to the required destination(s). If the required destinations have some older version of the data, the network node can calculate a delta changed version against the older destination version and only send the delta changes to the destination. This technique is useful in all scenarios where the data is transferred across the network two or more times (scenarios 2-4) regardless of the end-points repeating in the sequence. This technique is expected to provide a reduction in network utilization and in transmission latency, the latter depending on delta-compression time.

Predictive transfer combined with delta compression: If it is known (or can be anticipated) where the data will be needed next, the network node(s) can transfer an old version of the data to the anticipated destination(s) predictively. When the new data becomes available, only the delta needs to be transferred. It will be understood that this technique is similar to the staged data transfer with delta-compression, above, with the inclusion of the predictive first transfer. This technique can be anticipated to provide the same advantages described above.

Network processing, performing editing steps in the network. Network processing, such as non-interactive data analysis, filtering, etc. can be performed in the IFT servers located in the network in lieu of transferring edited data from the originator's end-point into the network. Interactive editing, of the network server-residing data by a customer, may be enabled. This technique is beneficial in all scenarios involving editing steps.

Store data in the network 120 servers and move the computations to the network nodes as well. Only transfer results to end-points. This technique again reduces the requirement for the transfer of data from a client site into the network, reducing end-point and network utilization.

Figure 5:
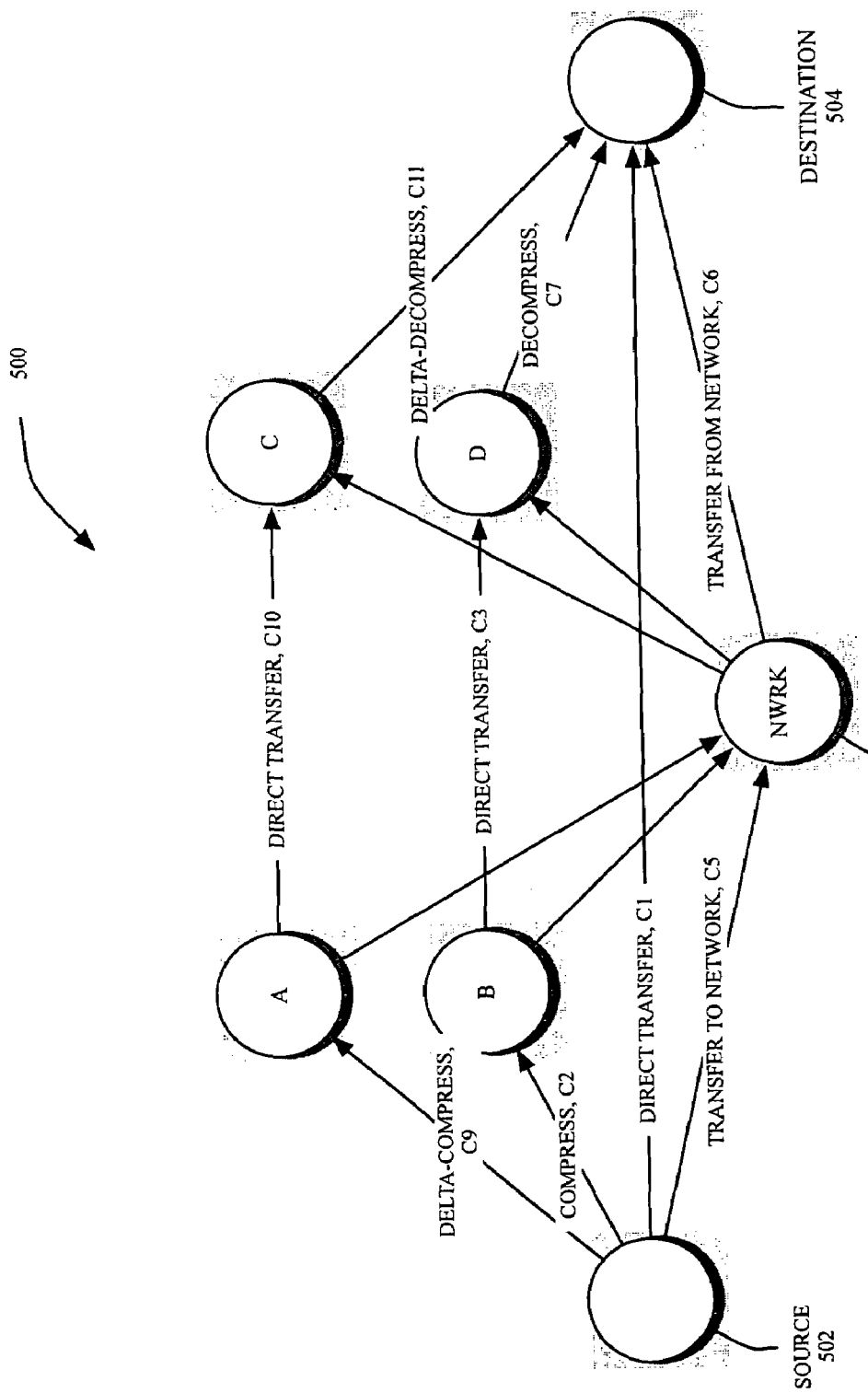
FIG. 5 shows a diagram generated for determining the parameters of a data transfer, constructed in accordance with the process of FIG. 7 and used in accordance with the process of FIG. 6.
Figure 6:
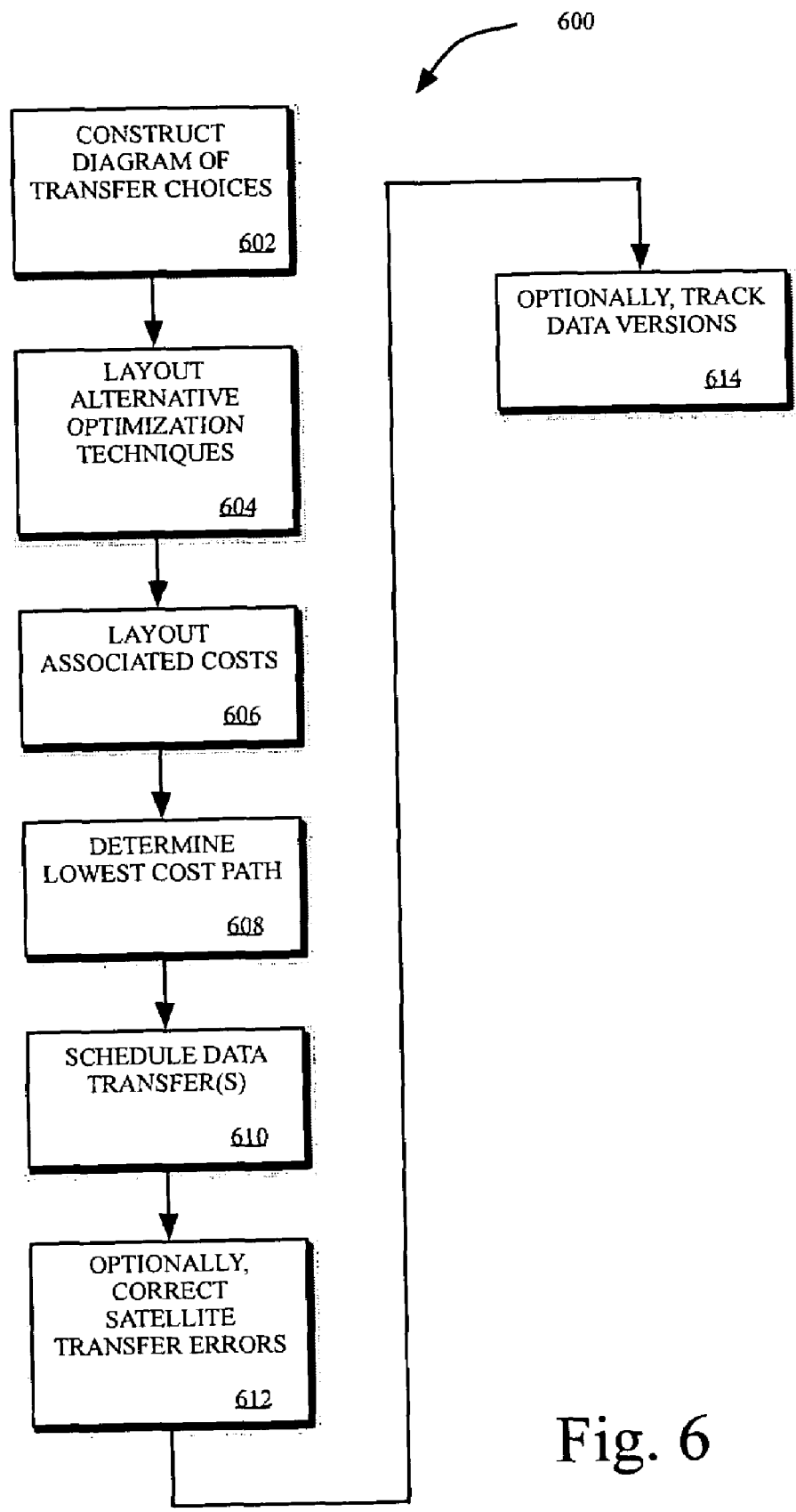
FIG. 6 shows a process for determining parameters of a data transfer.

With reference to FIGS. 5 and 6 together, there is shown a graph, or diagram, 500 for illustrating a process 600 for optimizing a data transfer in accordance with the present invention. With respect to the process of the present invention, it will be understood that such a process can be performed by i) the resources of one or both of customer sites 102, 110, ii) the resources of one or more of the IFT servers 122, 124, 126 in the network 120, and/or iii) any appropriate combination of the above. Diagram 500 is seen to include source and destination sites 502, 504, a plurality of possible transfer paths, a path consisting of possible data processing and data transfer techniques, for transferring a file from source 502 to destination 504. Each edge in figure represents local data processing (e.g., compression) or data transfer from an IFT server to another, either directly from the IFT server at the source 503 to an IFT server at the destination 504, or through intermediate IFT servers located in the network 506.

Figure 7:
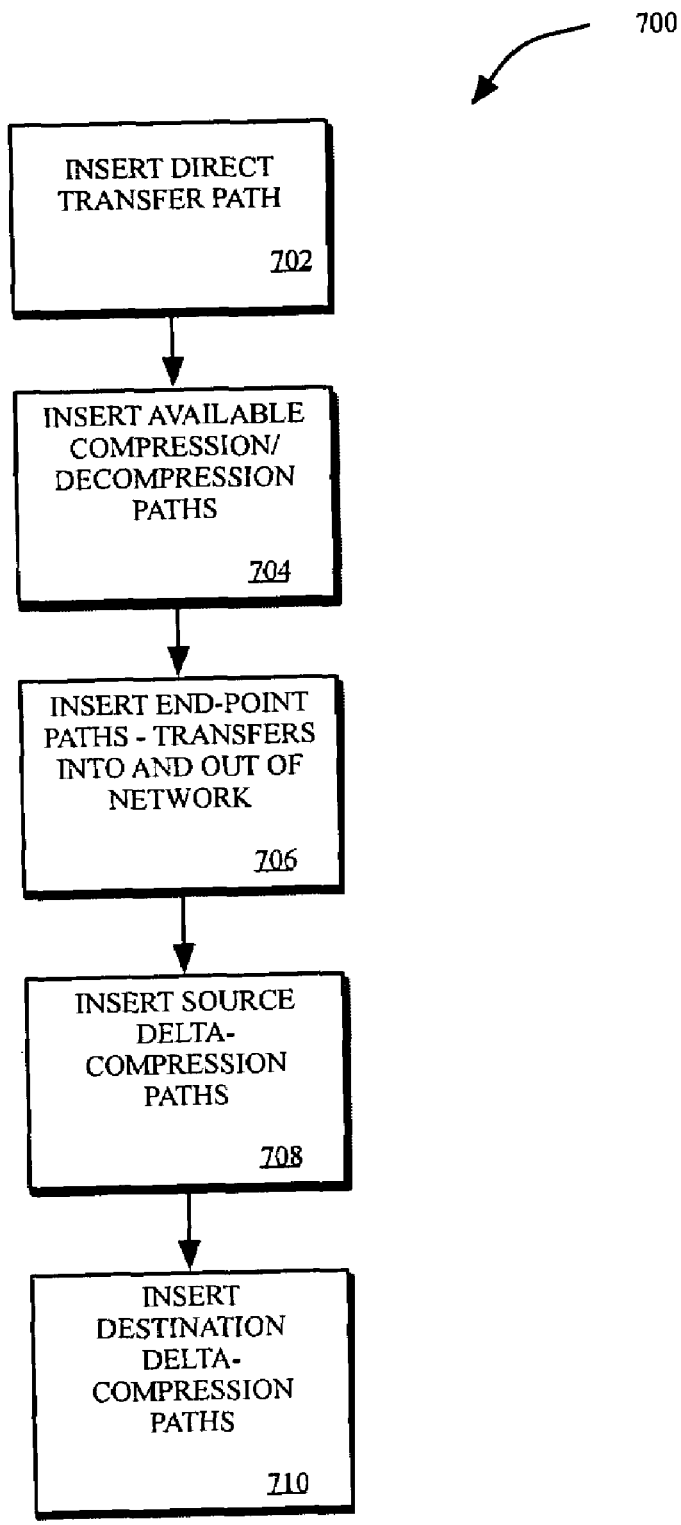
FIG. 7 shows a process for determining parameters of a data transfer.

Given the file source 502, destination 504, and a deadline D, input, for example, by a customer 102, 110 using user interface 300, the present invention determines which optimization techniques, in which order and when, are to be used to optimize the file transfer. In this described embodiment, there is constructed a graph 500 of feasible choices (step 602), as illustrated in FIG. 5, available for transferring the specified file from the source to the destination. Each directed edge, or path, in the graph represents the application of one available optimization technique that can be applied to the file (e.g., compression) (step 604) and has a cost "C" associated with the technique (step 606). Note that the cost may simply be the time it takes to execute the technique, but may also include aspects such as the usage of the different resources, for example the limited access links between the customer endpoints 102, 110 and network backbone 120. The cost for each edge is estimated (step 606) when the file transfer request is submitted by a user. The estimation is based on prior knowledge of the network topology and file characteristics, as well as performing the technique on a sample of the data, e.g., estimate transfer time by test transferring a 1 MB snippet of the data and estimating the effectiveness of compression by compressing 1 MB of the data; the transfer performed in actuality on the network 120 or by modeling on the simulator 204. After the graph has been completed and all the costs have been estimated, the optimal choice of techniques can be determined by simply finding the minimum cost path from the source to the destination (step 608). The graph is constructed (i.e. steps 604, 606) as follows with reference to process 700 of FIG. 7:

An edge, or path, for direct transfer from source to destination is added (step 702).

If the data can be compressed (i.e., it is not already compressed), paths for compression at the source, transfer of the compressed data, and decompression at the destination are added (step 704). Note that there may be a choice of compression algorithms and/or combinations of compression algorithms. If necessary, different paths for these alternatives may be created. If the source and destination share an older version of the data, similar edges are added for delta compression, transfer, and decompression.

Edges are added for transfer to the network and transfer from the network (step 706).

If the source and the network share the same version of the data, edges for delta compression at the source, transfer to the network, and delta-decompression at the network are added (step 708).

Similar edges for the destination are added if the network and the destination share the same old version of the data (step 710).

As noted above, the costs associated with the various paths are added generally at the time the data transfer request is received.

Using the diagram of FIG. 5 (as constructed by the process of FIG. 7) and the optimization process of FIG. 6, there is thus determined the optimal file transfer parameters (step 410 of FIG. 4). The optimizer 206 can perform these functions. As described below, the file transfer is now scheduled (step 412). The data transfer scheduler 208 can perform these functions.

Figure 8:
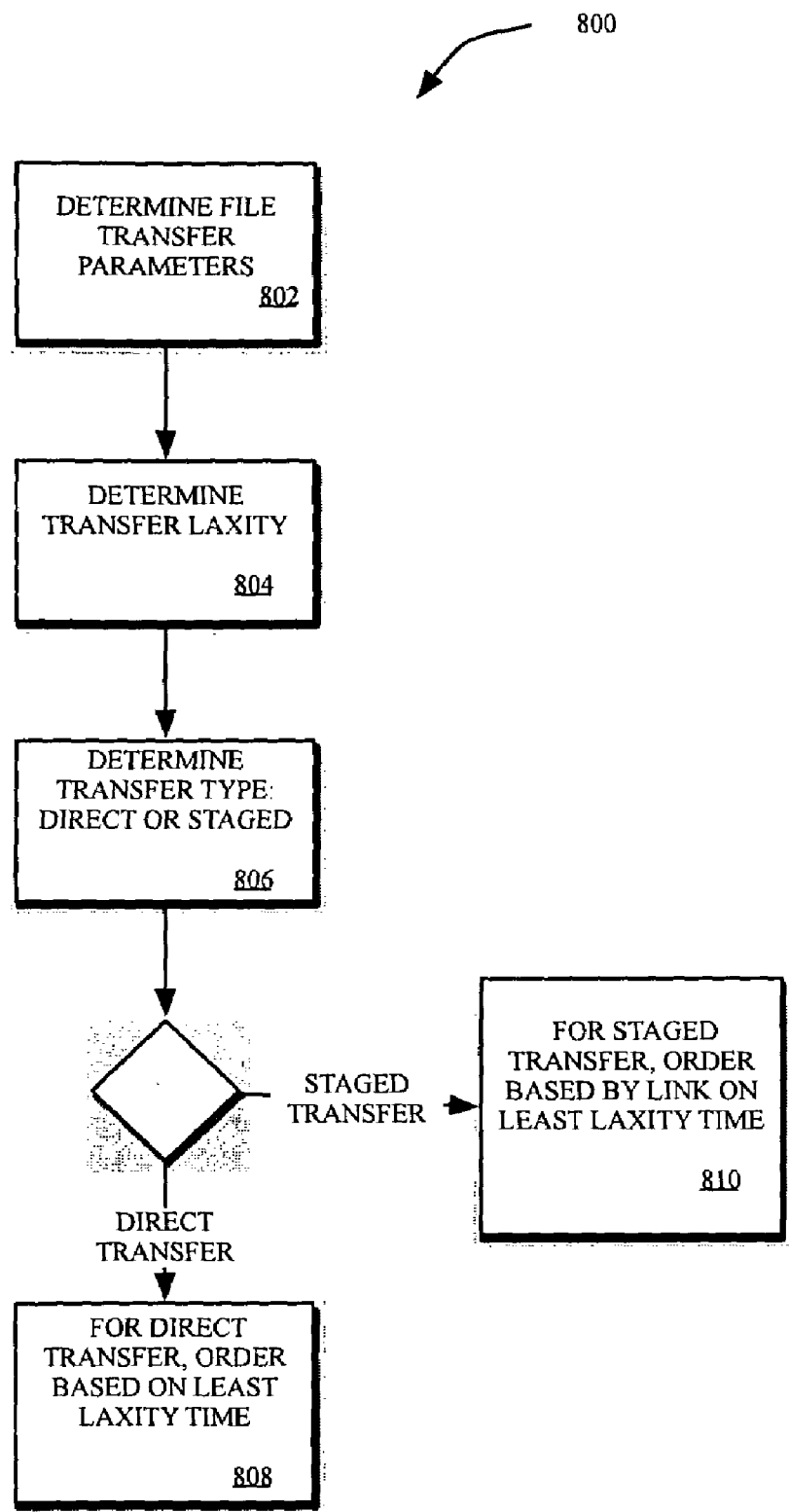
FIG. 8 shows a process for determining parameters of a data transfer.

With reference now back to FIGS. 5 and 6, given i) the deadline D of the file transfer as set out by the user above, ii) the optimal sequence of techniques for the file determined above, and iii) the list of scheduled but uncompleted file transfers over the affected network access links, there is next determined, with reference to a process 800 in FIG. 8, the schedule of when the data is to be transferred over each access link (step 610). As an example, for a file F, there are determined the initial file transfer parameters (step 802) as: D is the deadline and E is the estimated transfer time. There is defined a laxity (step 804), L, for the transfer of file F as: L=D−E.

There is determined the file transfer type, direct or staged (step 806). For direct transfers (with no intermediate storage in the network), the transfer request must be scheduled with regard to all other transfers that share the same access links. Therefore, the file transfers are simply ordered based on least laxity (least-laxity-first (LLF) scheduling) with regard to transfers on all the affected access links (step 808).

For staged transfers, there is defined $E_1$ and $E_2$ to be the estimated times to transfer file F to the network and from the network, respectively. Since the transfer is performed in two phases, the phases can be scheduled independently from one another with the exception that the first phase has to be completed before the second phase starts (or in case the phases are performed concurrently, the first phase must have started before the second phase starts). Thus, the deadline D is separated into two deadlines $D_1$ and $D_2$ where, $D_2=D$ and $D_1=D-E_2$ in the case where the phases are sequential. In case the phases can be concurrent (streaming), $D_1$ can be larger. Similar to above, the laxity of each transfer is now determined for each phase individually and LLF scheduling can be used on each link individually (step 810). This scheduling, can, for example, be performed by scheduler 208 and initiated by the data transfer daemons 210.

Again with reference back to FIG. 6, terrestrial error correction for satellite data can be used (step 612) in certain file transfer scenarios for each destination that receives a satellite broadcast of file F. The satellite broadcast uses error detection bits for each data block B in the file F, the blocks B in total comprising the entire transferred file or delta file, so that each receiver can determine for each block B if it received it correctly or if it got a corrupted block. Correction of corrupted blocks can be accomplished using a conventional peer-to-peer (P2P) algorithm: each peer node receiving a corrected block of data by contacting a random node neighbor to request a correct copy of corrupted blocks, asking for at most k blocks from each neighbor. If a requested block B is not found after a pre-determined number of attempts, the requesting node asks the original source node to transfer a copy of the block. Additionally, in accordance with embodiments of the invention, it is possible to:

Adjust the probability of the requesting neighbor node for a block to be proportional to the neighbor's access link bandwidth.

Use optional proxy servers inside the network 120 that collect requests for data blocks and information about available blocks. Using the information collected by the proxy servers, load-balance the requests to the appropriate peers nodes.

Additionally, it is possible to have the optional proxy servers cache requested blocks and serve them directly when requested, avoiding the repeated transmission of the data blocks over the limited access links.

Where data corrections and updates are performed at least partly within the network 120, the present invention determines which versions of the data it should store in the network and at the customer site IFT servers to be used for delta compression (step 614). Note that end-point delta-compression can only be used if the sender and receiver have a common earlier version of the data. Network-based delta-compression can be used if the sender and/or the receiver have the same earlier version of the data as the network. The value of establishing and maintaining a data copy is determined by the amount of data transfer that can be reduced by using this copy (either directly or by using delta-compression). The cost of a data copy is based on the amount of storage resource it consumes. The net benefit of establishing and maintaining a data copy thus depends on the transfer pattern of the file and deltas between users during the lifetime of the file. Such determinations can be made, for example, as follows:

If the data crosses the network only once from the original producer to one or more destinations, the value of any data copies anywhere is 0.

If the data is exchanged, more than once, in any direction(s), between the same two customer sites, data copies in the network have a value of 0. However, data copies at the IFT servers at the customer sites 102 and 110 have a value proportional to the file size and the number of exchanges for this data. Note, however, that a data copy is only valuable if it is the same version as a data copy at the other customer site, since that will enable delta-compression.

If the data is exchanged between 3 or more customer sites, with more than 1 network crossing where a one-to-many multicast counts as one crossing, the value of data copies in the network and at the customer sites are greater than 0. A data version copy in the network is valuable if i) this version is transferred to a customer site that does not have any prior version of the data, thus avoiding the transfer of data from the source to the network, or ii) if a source and/or destination of a data transfer shared the same version of the data, enabling delta-compression transfers from the source and to the destination. Similar to above, the value is proportional to the file size and the number of future exchanges of the data.

As indicated above, the value of data copies depends on the transfer pattern and number of transfers of a file over the lifetime of the file within the network. This information may be provided by the user of the data transfer service, or this information can be estimated by the system at runtime, for example by simulator 204, based on history of data transfers of similar type. Given the value of each data copy version, the storage at the IFT servers at the customer sites and in the network, can be de-allocated by removing the copies with the least value first.

There have thus been provided new and improved methods and systems for managing the transfer of large data files across electronic data networks optimally in accordance with the desired results of the users. The present invention takes into consideration the user-defined transfer requirements, the data characteristics, and the characteristics of the entirety of the network, including both the access links and the backbone and computing and storage resources available in the network. The present invention enables users to more optimally transfer data within the limitations of the existing network capabilities, negating requirements to update local or remote network facilities. The present invention has application in the field of electronic data communications.

While the invention has been shown and described with respect to particular embodiments, it is not thus limited.

Numerous modifications, changes and improvements with in the scope of the invention will now occur to the reader.

What is claimed is:

1. A method of determining an optimal process for transferring a data file of electronic data between a source having a source access link and one or more destinations each having a respective destination access link, across a network including stages containing storage and processing resources, the method comprising:
constructing a plurality of available data transfer sequences for a transfer of the data file including,
a direct path corresponding to a direct transfer of the data file from the source to the one or more destinations,
a plurality of compression paths, each compression path corresponding to a compression technique for compressing the data file at the source, a direct transfer of the data file from the source to the one or more destinations, and a decompression technique for decompressing the data file at the one or more destinations,
at least one staged path corresponding to transferring the data file from the source to at least one storage server in the network and then transferring the data file from the network to the one or more destinations, and
a plurality of staged compression paths, each corresponding to a compression technique for compressing the data file at the source, transferring the data file over at least one staged path in the network, and a decompression technique for decompressing the data file at the one or more destinations,
wherein said plurality of available data transfer sequences further include at least one of:
a path including a satellite transfer of the data file,
a path including a compression of delta-changes to the data file at the source, in the network, or at the one or more destinations,
a path including storage of the data file on the network, or
a path including processing of the data file on the network;
associating with each sequence a benefit and a cost; and
determining at least one data transfer sequence from said plurality of available data transfer sequences providing a desired benefit-to-cost ratio for the transfer of the data file based upon data parameters of the data file, network parameters of the network and user-defined transfer parameters for transferring the data file between the source and the one or more destinations, wherein said user-defined transfer parameters are determined before said determining at least one data transfer sequence, wherein said determining at least one data transfer sequence is performed by an optimizer of a server.

2. The method of claim 1, further comprising:
initiating the transfer of the data file in accordance with the at least one data transfer sequence, wherein said initiating the transfer of the data file includes applying the at least one data transfer sequence to the data file.

3. The method of claim 2, wherein said initiating the transfer of the data file includes scheduling the transfer of the data file.

4. The method of claim 3, wherein said scheduling the transfer of the data file includes selecting between a direct data transfer and a staged data transfer.

5. The method of claim 4, wherein said scheduling the transfer of the data file includes selecting the transfer of least laxity first for ordered data transfers.

6. The method of claim 1, further including:
correcting for satellite errors, if the at least one determined data transfer sequence includes a satellite transfer.

7. The method of claim 1, further including:
tracking a version of the data file, if the at least one data transfer sequence includes a delta compression technique.

8. An apparatus for determining an optimal process for transferring a data file of electronic data between a source having a source access link and one or more destinations each having a respective destination access link across a network including stages containing storage and processing resources, the apparatus comprising:
means for constructing a plurality of available data transfer sequences for a transfer of the data file including,
a direct path corresponding to a direct transfer of the data file from the source to the one or more destinations,
a plurality of compression paths, each compression path corresponding to a compression technique for compressing the data file at the source, a direct transfer of the data file from the source to the one or more destinations, and a decompression technique for decompressing the data file at the one or more destinations,
at least one staged path corresponding to transferring the data file from the source to at least one storage server in the network and then transferring the data file from the network to the one or more destinations, and
a plurality of staged compression paths, each corresponding to a compression technique for compressing the data file at the source, transferring the data file over at least one staged path in the network, and a decompression technique for decompressing the data file at the one or more destinations,
wherein said plurality of available data transfer sequences further include at least one of:
a path including a satellite transfer of the data file,
a path including a compression of delta-changes to the data file at the source, in the network, or at the one or more destinations,
a path including storage of the data file on the network, or
a path including processing of the data file on the network;
means for associating with each sequence a benefit and a cost; and
means for determining at least one data transfer sequence from said plurality of available data transfer sequences providing a desired benefit-to-cost ratio for the transfer of the data file based upon data parameters of the data file, network parameters of the network and user-defined transfer parameters for transferring the data file between the source and the one or more destinations, wherein said user-defined transfer parameters are determined before said determining at least one data transfer sequence, wherein said determining at least one data transfer sequence is performed by an optimizer of a server.

9. The apparatus of claim 8, further comprising:
means for initiating the transfer of the data file in accordance with the at least one data transfer sequence, wherein said initiating means applies the at least one data transfer sequence to the data file.

10. The apparatus of claim 9, wherein said initiating means comprises a means for scheduling the transfer of the data file.

11. The apparatus of claim 10, wherein said scheduling means selects between a direct data transfer and a staged data transfer.

12. The apparatus of claim 11, wherein said scheduling means selecting the transfer of least laxity first for ordered data transfers.

13. The apparatus of claim 8, further comprising:
means for correcting for satellite errors if the at least one determined data transfer sequence includes a satellite transfer.

14. The apparatus of claim 8, further comprising:
means for tracking a version of the data file if the at least one data transfer sequence includes a delta compression technique.

15. A system for determining an optimal process for transferring a data file of electronic data between a source having a source access link and one or more destinations each having a respective destination access link across a network including stages containing storage and processing resources, the system comprising:
a server for constructing a plurality of available data transfer sequences for a transfer of the data file including,
a direct path corresponding to a direct transfer of the data file from the source to the one or more destinations,
a plurality of compression paths, each compression path corresponding to a compression technique for compressing the data file at the source, a direct transfer of the data file from the source to the one or more destinations, and a decompression technique for decompressing the data file at the one or more destinations,
at least one staged path corresponding to transferring the data file from the source to at least one storage server in the network and then transferring the data file from the network to the one or more destinations, and
a plurality of staged compression paths, each corresponding to a compression technique for compressing the data file at the source, transferring the data file over at least one staged path in the network, and a decompression technique for decompressing the data file at the one or more destinations,
wherein said plurality of available data transfer sequences further include at least one of:
a path including a satellite transfer of the data file,
a path including a compression of delta-changes to the data file at the source, in the network, or at the one or more destinations,
a path including storage of the data file on the network, or
a path including processing of the data file on the network;
the server for associating with each sequence a benefit and a cost; and
the server for determining at least one data transfer sequence from said plurality of available data transfer sequences providing a desired benefit-to-cost ratio for the transfer of the data file based upon data parameters of the data file, network parameters of the network and user-defined transfer parameters for transferring the data file between the source and the one or more destinations, wherein said user-defined transfer parameters are determined before said determining at least one data transfer sequence.

16. The system of claim 15, wherein the server initiates a transfer of the data file in accordance with the at least one determined data transfer sequence, wherein said initiating comprises applying the at least one determined data transfer sequence to the data file.

17. The system of claim 16, wherein the server schedules the transfer of the data file.

18. The system of claim 17, wherein the server selects between a direct data transfer and a staged data transfer.

19. The system of claim 18, wherein the server selects the transfer of least laxity first for ordered data transfers.

20. The system of claim 15, wherein the server tracks a version of the data file if the at least one data transfer sequence includes a delta compression technique.

* * * * *